United States Patent Office 3,501,403
Patented Mar. 17, 1970

3,501,403
ORGANIC COMPOSITIONS CONTAINING
OXIDATION RETARDERS
James Keith Jacques, Walsall, England, and William John Owen, Penarth, Wales, assignors to Electric Reduction Company of Canada, Ltd., Islington, Ontario, Canada, a Canadian company
No Drawing. Filed Mar. 21, 1967, Ser. No. 624,690
Claims priority, application Great Britain, Mar. 21, 1966, 12,392/66
Int. Cl. C10m 1/50; C07f 9/28
U.S. Cl. 252—46.7                              3 Claims

ABSTRACT OF THE DISCLOSURE

The invention provides a mineral oil composition having superior oxidation resistance consisting of a mineral oil and between about 0.02 and 0.25% by weight of an oxidation retarder having the formula $$R_{(4-n)}Si(CH_2PS_{(m-1)}R'_2)_n$$

wherein each R is selected from halogen atoms and alkyl, aryl, aralkyl and alkoxyl groups each having from 1 to 18 carbon atoms, each R' is selected from alkyl, aryl, alkaryl, alkoxyl and mercaptyl groups each having from 1 to 18 carbon atoms, $n$ is an integer from 1 to 4, and $m$ is an integer from 1 to 2.

---

The present invention relates to organic compositions which contain oxidation retarders. It is particularly applicable to lubricating compositions and organic polymers.

It is known that amounts of from 0.5 to 2% by weight of certain compounds containing atoms of silicon and phosphorus linked by alkylene groups containing at least 2 carbon atoms reduce the tendency of plastics to react with atmospheric oxygen, see for example British patent specification No. 925,721. We have also discovered that certain of these compounds also have the particular property, when added to lubricating oils, of inhibiting lacquer formation on the piston rings of internal combustion engines, and prolonging the life of the lubricant. Contrary to the suggestion of the aforesaid patent specification, which states that compounds in which the silicon and phosphorus atoms are joined by alkylene groups having 3 to 12 carbons are preferred to those in which the alkylene group has two carbon atoms, we have now discovered that the lacquer inhibiting properties of such compounds diminish as the number of carbon atoms forming the alkylene chain is increased. We have now prepared compounds containing atoms of silicon and phosphorus linked by a methylene group, and have unexpectedly found that these compounds have a tendency to retard the oxidation of organic compositions and especially to inhibit the formation of lacquer on piston rings that is greater than the similar tendency of the corresponding compositions described in British patent specification No. 925,721. We have further found that compounds containing a silicon and phosphorus atom linked by a methylene group are effective in retarding the oxidation of organic compositions at concentrations significantly smaller than the 0.5% to 2% by weight described in British Patent 925,721.

Our invention provides a composition comprising an organic material having a tendency to react with atmospheric oxygen, admixed with a minor proportion of an organic oxidation retarder containing atoms of silicon and phosphorus linked by a methylene group.

The preferred silicon and phosphorus containing oxidation retarders for use according to our invention are those having the formula $R_{(4-n)}Si(CH_2PS_mR'_2)_n$ where each R is an alkyl, aryl, alkaryl or alkoxyl group or a halogen atom; R' is an alkyl, aryl, alkaryl, alkoxyl or mercaptyl group, $m$ is zero or 1 and $n$ is an integer from 1 to 4. Preferably R and R' are each alkyl groups having from 1 to 18 carbon atoms or are phenyl groups.

The organic material having a tendency to react with atmospheric oxygen may be a natural or synthetic lubricant e.g. a mineral oil, a dicarboxylic ester such as dioctyl sebacate, or a polysiloxane fluid. Alternatively the composition may be a polymer such as polyvinyl chloride or a silicone rubber. Certain compositions according to our invention may also be employed as hydraulic fluids, heat transfer fluids or as additives for reducing the tendency of light paraffin fluids, waxes, long chain fatty acids, and similar substances to react with atmospheric oxygen.

Preferred compositions of our invention are functional fluids comprising a natural or synthetic lubricant and at least 0.01% by weight of an oxidation retarder of the formula $R_{(4-n)}Si(CH_2PS_mR'_2)_n$ where each R is an alkyl group having one to eighteen carbon atoms, $m$ is zero or 1, $n$ is an integer from 1 to 4 and R' is an alkyl or aryl group. R' preferably has from one to eighteen carbon atoms.

Our invention also provides apparatus provided with liquid means for lubrication or heat or pressure transfer, which liquid means comprises a functional fluid according to our invention.

Particularly significant are the small quantities of additive which have been found effective for use in the present invention for the inhibition of lacquer formation, and the valuable anti-wear properties of certain of the compositions where employed in lubricants. Preferably an oxidation retarder according to our invention is present in a proportion of greater than 0.01%, e.g. from 0.01% to 1% by weight. Particularly preferred are compositions containing 0.02 to 0.2% by weight of the oxidation retarder. However, particularly in mineral oil lubricants, it is sometimes convenient to incorporate from 1 to 5% by weight of the oxidation retarder, since at such concentrations we have discovered that the compositions may be endowed with properties in addition to resistance to oxidation. The anti-wear properties are particularly significant in the lubrication of surfaces of aluminium which has hitherto presented a problem.

Functional fluids according to our invention may contain minor proportions of other additives such as those conventionally added to lubricant oils, including additional anti-wear, antioxidant or anticorrosion additives. Our invention also provides greases in which a functional fluid according to our invention is combined with up to 60% by weight of a filler e.g. a soap such as lithium stearate.

The invention is illustrated by the following examples:

EXAMPLE 1

Methyl dibutyl diphenylphosphinomethyl silane $$CH_3(C_4H_9)_2SiCH_2P(C_6H_5)_2$$

(referred to as compound A) was dissolved in a mineral oil sold commercially as "Vitrea 41" in various concentrations. The resulting composition was employed as a lubricant in tests to determine lacquer deposition on a simulated internal combustion engine piston.

Extent of deposition of lacquer, and colour intensity, measured against an arbitrary standard were compared with the base oil alone, and with various commercial antioxidants, and reported in Table 1 below. A high degree of lacquer inhibition is characterised by a small extent of deposition and low colour intensity.

TABLE 1

| Lubricant | ⅓% A | ¼% A | ⅒% A | 1/20%A | 1/50% A | Base oil alone | Phenothiazine ½% | ¼% | ⅒% | 2,6-dit.butylphenol ½% | ¼% |
|---|---|---|---|---|---|---|---|---|---|---|---|
| Extent of deposition (mm.) | 23 | 20 | 15 | 25 | 25 | 35 | 20 | 25 | 35 | 22 | 26 |
| Colour intensity | 4+ | 4− | 4 | 4+ | 4− | 6+ | 4 | 5+ | 6 | 4− | 5+ |

EXAMPLE 2

A steel ball was fixed in the chuck of a vertically mounted motor, and rotated at 1400 r.p.m. under a load of 100 kg. in contact with three aluminium balls, clamped in a locking ring and immersed in the lubricant under test. After 2 minutes the mean scar diameter on the aluminium balls was measured. A commercial mineral oil lubricant, sold under the name "Citcon 90," gave a mean scar diameter of 1 mm. A lubricant consisting of 1% by weight of compound A in "Citcon 90" mineral oil gave a mean scar diameter of 0.92 mm.

We claim:

1. A mineral oil composition having superior oxidation resistance consisting of a mineral oil and between about 0.02 and 0.25% by weight of an oxidation retarder having the formula $R_{(4-n)}Si(CH_2PS_{(m-1)}R'_2)_n$ wherein each R is selected from halogen atoms and alkyl, aryl, aralkyl and alkoxyl groups each having from 1 to 18 carbon atoms, each R' is selected from alkyl, aryl, alkaryl, alkoxyl and mercaptyl groups each having from 1 to 18 carbon atoms, $n$ is an integer from 1 to 4, and $m$ is an integer from 1 to 2.

2. A composition according to claim 1 comprising 0.02 to 0.2% of the oxidation retarder based on the total weight of the composition.

3. A composition according to claim 1 wherein said oxidation retarder is methyl dibutyl diphenylphosphinomethyl silane.

References Cited

UNITED STATES PATENTS

| | | | |
|---|---|---|---|
| 3,067,229 | 12/1962 | Fekete | 252—49.9 X |
| 3,201,447 | 8/1956 | Cyba | 252—46.7 X |
| 3,367,870 | 1/1968 | Spivack | 252—49.8 |
| 3,400,083 | 1/1968 | Schugar et al. | 252—49.8 |

FOREIGN PATENTS 925,721   5/1963   Great Britain.

DANIEL E. WYMAN, Primary Examiner

W. CANNON, Assistant Examiner

U.S. Cl. X.R.

252—78, 400; 260—448.2, 448.8